United States Patent
Clarke

(10) Patent No.: US 6,176,959 B1
(45) Date of Patent: Jan. 23, 2001

(54) METHOD FOR MICROTEXTURIZING AND BONDING TWO SURFACES

(75) Inventor: James A. Clarke, Greenlawn, NY (US)

(73) Assignee: Vought Aircraft Industries, Inc., Dallas, TX (US)

( * ) Notice: Under 35 U.S.C. 154(b), the term of this patent shall be extended for 0 days.

(21) Appl. No.: 09/246,241

(22) Filed: Feb. 8, 1999

(51) Int. Cl.$^7$ ........................................... B32B 31/12
(52) U.S. Cl. .................. 156/272.8; 156/281; 219/121.69
(58) Field of Search ................ 156/272.8, 281; 427/554, 555, 556; 372/2; 219/121.6, 121.68, 121.69, 121.85

(56) References Cited

U.S. PATENT DOCUMENTS

| | | | |
|---|---|---|---|
| 3,959,091 | * 5/1976 | Moji et al. | 205/50 |
| 4,479,218 | * 10/1984 | Brau et al. | 372/2 |
| 4,673,409 | 6/1987 | Van Kampen | 623/23 |
| 4,861,407 | 8/1989 | Volkmann et al. | 156/272.8 |
| 4,931,125 | 6/1990 | Volkmann et al. | 156/272.8 |
| 5,338,915 | 8/1994 | Hildebrand et al. | 219/121.69 |
| 5,473,138 | * 12/1995 | Singh et al. | 219/121.69 |

* cited by examiner

Primary Examiner—Michael W. Ball
Assistant Examiner—Michael A Tolin
(74) Attorney, Agent, or Firm—Stetina Brunda Garred & Brucker

(57) ABSTRACT

A process for adhesively bonding two adherends to each other. The process includes directing a laser beam having characteristics substantially equivalent to a free electron laser to a respective surface of each of a first and/or second adherend to effectuate ablation of any organic and halogenated residues present on the surfaces, to glaze each surface, to form a substantially stable oxide layer thereon, and to microtexturize each surface such that a roughened surface with a tailored topography is formed on each surface. Thereafter, an adhesive is applied to at least one roughened surface and the two roughened surfaces are placed against each other such that the adhesive bonds the adherends along these respective roughened surfaces and provides a high-strength, long-term durability in most environments.

20 Claims, 1 Drawing Sheet

METHOD FOR MICROTEXTURIZING AND BONDING TWO SURFACES

FIELD OF THE INVENTION

This invention relates in general to adhesive bonding, and in particular to a method for adhesively bonding two adherends to each other by first microtexturing subsequently mating surfaces with a laser beam having ultraviolet and infrared wavelength capability and pico-second pulse duration substantially equivalent to a free electron laser. Such microtexturing provides a tailored surface topography and stable oxide morphology on one or both surfaces to be bonded prior to application thereto of an adhesive and the positioning of the respective surfaces against each other.

BACKGROUND OF THE INVENTION

The formation of effective adhesive bonds is critical in many applications, including the formation of a joint between two adherends. Fundamental to the formation of an effective bond is acceptance of the bonding material or adhesive by the articles to be joined, compatibility of the surface geometries, and environmental stability of the two sites where adhesion is to occur. In particular, the surface geometry must be such as to provide maximum wetted surface per unit area and interlocking features that result in a high strength bond-line.

While surface preparation or texturizing to achieve the foregoing characteristics is desired, prior art approaches for preparing adherends have not met this goal. For example, chemical cleansing and texturizing treatments preceding adhesive applications can easily result in surface and sub-surface contamination at the sites to be joined to thereby interfere with bonding. Further, with chemical as well as conventional laser beam treatments, surface textures are inadequately refined to efficiently interact with surface tension characteristics, wetability of adhesives, or to provide an optimum surface topography. Further, typical metal oxides formed on bonding surfaces generally are unstable and result in poor bond-line durability or fatigue life when used in a hostile environment as exemplified by hot-wet.

In view of the above considerations, it is apparent that a need is present for methodology that enhances adhesive bonding of two parts. Accordingly, it is a primary object of the present invention to provide a process for adhesively bonding two adherends to each other wherein a laser beam having free-electron laser characteristics aimed at surfaces to be adhered ablates organic and halogenated residues present on the surfaces.

Another object of the present invention is to provide a bonding process wherein such a laser beam aimed at surfaces to be adhered microtexturizes the surfaces by glazing the surfaces and forming a controlled stable oxide layer.

Yet another object of the present invention is to provide a process for adhesively bonding two adherends wherein such a laser beam aimed at surfaces to be adhered microtexturizes the surfaces to a controlled topography by forming depressions and whisker projections on the surfaces to enhance mechanical interlocking of the two adherends with the adhesive and substantially match surface tensions of the surfaces and the adhesive being used.

These and other objects of the invention will become apparent throughout the description thereof which now follows.

SUMMARY OF THE INVENTION

The present invention is a process for adhesively bonding two adherends to each other. The process comprises directing a laser beam having characteristics of a free electron laser to a respective surface of each of a first and/or second adherend to effectuate a microtexturizing of the surface. As used throughout herein, the term "laser beam" is defined to mean a laser beam having characteristics equivalent to those of a free-electron laser with respect to energy, ultraviolet and infrared capability, and pico-second pulse duration. Resultant microtexturizing causes ablation of any organic and halogenated residues present on the surface, glazes the surface, forms a stable metal oxide layer, and tailors the topography to optimum geometry for maximum shear strength and surface wetting with the adhesive by forming depressions and whisker projections on the surfaces to thereby substantially increase wetted area, match surface tensions of the surfaces with the adhesive being used and maximize bond strength. The laser beam is particularly capable of creating this morphology and producing an oxide that is stable in a hostile environment, thereby providing a tailored oxide that, in many instances, is stable enough to eliminate the need for priming a surface prior to applying an adhesive. After such microtexturizing, an adhesive is applied to at least one roughened surface and the two textured surfaces are placed against each other such that the adhesive, with associated curing process, bonds the adherends to each other along these respective roughened surfaces. The laser beam microtexturizes the surfaces.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
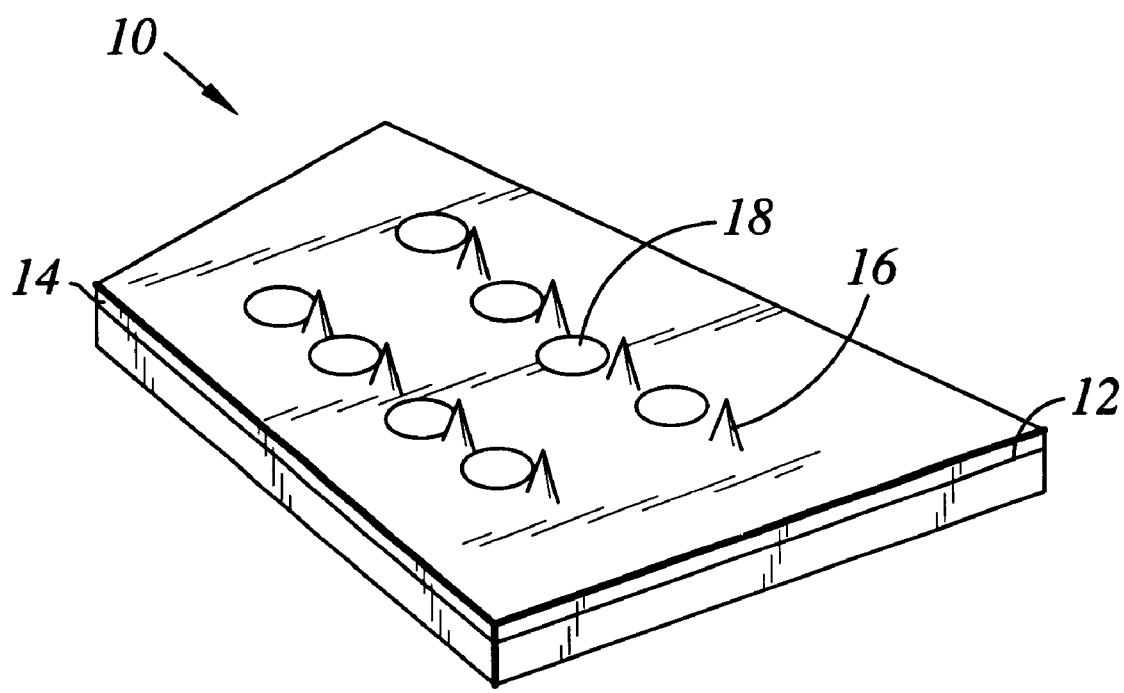
FIG. 1 is a graphic illustration of a piece of titanium metal after microtexturization of a surface thereof with a free electron laser beam.

Referring to FIG. 1, a piece 10 of titanium metal is illustrated after a surface 12 thereof has been treated by a laser having UV and IR wavelength capability and pico-second pulse duration. Such surface treatment includes directing the laser beam to the surface 12 for a time period sufficient to first clean the surface 12 by ablating any organic and halogenated residues there present. Beam direction to the surface 12 continues, first, until the surface is glazed and a rutile $TiO_2$ oxide layer 14 preferably of a thickness of from about 200 Å to about 600 Å forms thereon, and, second, until each surface is microtexturized such that a roughened surface preferably from about 75 Å to about 125 Å thick is formed. Microtexturization geometry is comprised of whisker-like projections 16 and cell-shaped depressions 18 which aid in the adsorption of an adhesive and in approximating a surface tension match between the adhesive and the surface 12 to thereby accomplish maximized mechanical bonding. In the same manner as described above, a surface of a second piece of titanium metal to which the first piece is to be adhered is treated with an free electron laser beam. Thereafter, an adhesive is applied to either one or both of the treated surfaces and the surfaces are joined for adhesive bonding.

EXAMPLE

In accord with the above description, two pieces of titanium metal were placed in respective holders whereby each had an exposed surface for subsequent bonding to the other's surface. A laser beam was generated by a free electron laser beam generation device available from the Department of Energy, Jefferson Laboratory, Newport News, Virginia. The beam should have the following characteristics:

wave length: 200–10⁴nm
power: 1–2.3kw
optical beam quality: <2.0 diffraction limit
pulse length: 1–10 pico-seconds
repetition rate: 10 Hz to 40 MHz Representative titanium specimens with effectively glazed and textured oxidized surfaces have been prepared using a wavelength of 240 nm, a pulse energy of $1.2J/cm^2$, a repetition rate of 150 Hz, and an air purge on scan speed of 1600 steps per second, steps of 0.2 micrometers, and 2 passes. Laser parameters are selected to obtain a microtextured surface that is clean and has a rutile titanium dioxide and tailored geometric morphology. Upon completion of surface microtexturization, the specimens are cured with 0.10 psf of FMX5 adhesive at 700° F. for one hour. FMXS adhesive is manufactured by CYTEC Engineered Materials, Havre de Grace, Md., and was chosen since its surface tension value and that of the microtexturized exposed surfaces were nearly identical to thereby enhance adhesion.

In addition to bonding titanium parts together, other metal adherends can be treated in the same manner as set forth above, with modifications in accord with those apparent to a skilled artisan in view of the above example. Also one metal, so texturized, may be bonded to a pre-cured or co-cured non-texturized composite laminated material such as an epoxy which may be reinforced with glass or graphite fibers. Therefore, while an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A process for adhesively bonding a metal adherend to a second adherend, the process comprising:
   a) providing a first metal adherend and a second adherend, each having a respective surface to be joined to the other respective surface;
   b) providing a laser beam;
   c) directing the laser beam to the metal adherend surface for a time and intensity sufficient to effectuate ablation of any organic and halogenated residues present on the surface, to glaze said surface, to form a substantially stable metal oxide layer thereon, and to microtexturize said surface such that a roughened surface is formed; and
   d) applying an adhesive to the one roughened surface and placing the one roughened surface against the second adherend such that the adhesive bonds the metal and second adherends to each other along their respective surfaces.

2. The process as claimed in claim 1 wherein the oxide layer is from about 200 Å to about 600 Å thick.

3. The process as claimed in claim 2 wherein the roughened surface of the metal adherend is from about 75 Å to about 125 Å thick.

4. The process as claimed in claim 3 wherein the roughened surface of the metal adherend comprises cellular depressions and whisker projections.

5. The process as claimed in claim 1 wherein the roughened surface of the metal adherend is from about 75 Å to about 125 Å thick.

6. The process as claimed in claim 1 wherein the roughened surface of the metal adherend comprises cellular depressions and whisker projections.

7. A process for adhesively bonding two metal adherends to each other, the process comprising:
   a) providing a first adherend and a second adherend, each having a respective surface to be joined to the other respective surface;
   b) providing a laser beam;
   c) directing the laser beam to each respective surface for a time and intensity sufficient to effectuate ablation of any organic and halogenated residues present on the surfaces, to glaze each said surface, to form a substantially stable metal oxide layer thereon, and to microtexturize each said surface such that a roughened surface is formed on each surface; and
   d) applying an adhesive to at least one roughened surface and placing the two roughened surfaces against each other such that the adhesive bonds the adherends to each other along their respective roughened surfaces.

8. The process as claimed in claim 7 wherein each of the first and second adherends is titanium.

9. The process as claimed in claim 8 wherein the oxide layer is from about 200 Å to about 600 Å thick.

10. The process as claimed in claim 9 wherein the roughened surface of each of the first and second adherends is from about 75 Å to about 125 Å thick.

11. The process as claimed in claim 10 wherein the roughened surface of each of the first and second adherends comprises cellular depressions and whisker projections.

12. The process as claimed in claim 7 wherein the oxide layer is from about 200 Å to about 600 Å thick.

13. The process as claimed in claim 7 wherein the roughened surface of each of the first and second adherends is from about 75 Å to about 125 Å thick.

14. The process as claimed in claim 7 wherein the roughened surface of each of the first and second adherends has an oxide layer of from about 200 Å to about 600 Å.

15. A process for adhesively bonding titanium adherends to each other, the process comprising:
   a) providing a first titanium adherend and a second titanium adherend, each having a respective surface to be joined to the other respective surface;
   b) providing a laser beam;
   c) directing the laser beam to each respective surface for a time and intensity sufficient to effectuate ablation of any organic and halogenated residues present on the surfaces, to glaze each said surface, form a substantially stable rutile $TiO_2$ oxide layer thereon, and to microtexturize each said surface such that a roughened surface is formed on each surface; and
   d) applying an adhesive to at least one roughened surface and placing the two roughened surfaces against each other such that the adhesive bonds the titanium adherends to each other along their respective roughened surfaces.

16. The process as claimed in claim 15 wherein the rutile $TiO_2$ oxide layer is from about 200 Å to about 600 Å thick.

17. The process as claimed in claim 16 wherein the roughened surface of each of the first and second titanium adherends is from about 75 Å to about 125 Å thick.

18. The process as claimed in claim 17 wherein the roughened surface of each of the first and second titanium adherends comprises cellular depressions and whisker projections.

19. The process as claimed in claim 15 wherein the roughened surface of each of the first and second titanium adherends is from about 75 Å to about 125 Å thick.

20. The process as claimed in claim 15 wherein the roughened surface of each of the first and second titanium adherends comprises cellular depressions and whisker projections.

* * * * *